United States Patent [19]

Massie et al.

[11] Patent Number: 5,220,100
[45] Date of Patent: Jun. 15, 1993

[54] METHOD OF REMOVING LITHIUM COMPOUNDS FROM A POLYMER

[75] Inventors: Stephen N. Massie, Spring; Jaroslav G. Balas, Houston; Loralee A. Logan, Missouri City, all of Tex.

[73] Assignee: Shell Oil Company, Houston, Tex.

[21] Appl. No.: 920,694

[22] Filed: Jul. 28, 1992

[51] Int. Cl.$^5$ .................. C07C 7/12; C07C 7/00; C08F 6/00

[52] U.S. Cl. .................. 585/823; 585/851; 585/852; 585/864; 585/868; 528/482; 528/496; 528/490

[58] Field of Search .............. 585/823, 851, 852, 864, 585/868; 528/482, 496, 490

[56] References Cited

U.S. PATENT DOCUMENTS

| | | |
|---|---|---|
| 3,600,463 | 8/1971 | Hagemeyer, Jr. et al. |
| 4,029,879 | 6/1977 | Muzzio . |
| 4,250,270 | 2/1981 | Farrar . |
| 4,507,475 | 3/1985 | Straehle et al. |
| 4,528,364 | 7/1985 | Prier . |
| 4,952,304 | 8/1990 | Timms . |

FOREIGN PATENT DOCUMENTS

| | | |
|---|---|---|
| 7240867R | 3/1969 | Japan . |
| 47-40866 | 10/1972 | Japan . |
| 77023671 | 4/1974 | Japan . |
| 53096080 | 2/1977 | Japan . |
| 53096098 | 2/1977 | Japan . |
| 54112999 | 2/1978 | Japan . |
| 60027593A | 7/1983 | Japan . |
| 60181126A | 2/1984 | Japan . |

Primary Examiner—Anthony McFarlane
Assistant Examiner—Nhat D. Phan

[57] ABSTRACT

A process for separating an alkali metal or alkali metal compound from a polymer comprising a conjugated diolefin and/or an alkenyl aromatic hydrocarbon monomer wherein a polymer and one or more alkali metal compounds is contacted with a suitable solid adsorbent. Preferably, the solid adsorbent will be selected from the group consisting of alumina, silica-alumina, silica and mixtures thereof.

17 Claims, No Drawings

METHOD OF REMOVING LITHIUM COMPOUNDS FROM A POLYMER

BACKGROUND OF THE INVENTION

1. Field of the Invention

This invention relates to a process for separating alkali metal compounds from a polymer. More particularly, this invention relates to a method for removing alkali metal compounds from a polymer comprising a conjugated diolefin and/or an alkenyl aromatic hydrocarbon monomer unit.

2. Prior Art

Heretofore, several methods have been proposed for separating certain alkali metal compounds, particularly lithium compounds from a polymer, particularly a conjugated diolefin polymer. In general, these methods involve contacting the polymer and alkali metal-containing composition with water and/or an acid. A principal problem associated with these methods is that each introduces an impurity into the polymer which must be removed before the polymer is suitable for at least most end use applications. These methods, then, add a rather complicated separation step to the processes. While the separation processes may be reasonably successful they frequently result in at least a small amount of impurity remaining in the polymer composition. Also, the separation step is an added, rather complicated, step in preparing the polymer composition for its various end use applications. The need, then, for a process which will separate alkali metal compounds, particularly lithium compounds, from a polymer comprising a conjugated diolefin and/or an alkenyl aromatic hydrocarbon monomer without introducing impurities thereto and without introducing a rather complicated "clean-up" or purification step is believed to be readily apparent.

SUMMARY OF THE INVENTION

It has now been discovered that the foregoing and other disadvantages of the prior art processes for separating alkali metal compounds, particularly lithium compounds, from a polymer comprising a conjugated diolefin and/or an alkenyl aromatic hydrocarbon can be avoided or at least significantly reduced with the method for separating alkali metal compounds, particularly lithium compounds, and an improved process provided thereby. It is, therefore, an object of this invention to provide an improved process for separating alkali metal compounds, particularly lithium compounds, from a polymer comprising a conjugated diolefin and/or an alkenyl aromatic hydrocarbon monomer. It is another object of this invention to provide such an improved process wherein the alkali metal compounds are separated without introducing an impurity therein. It is another object of this invention to provide such an improved process wherein the alkali metal compounds can be separated with a reduced number or at least simpler processing steps. The foregoing and other objects and advantages will become apparent from the description of the invention set forth hereinafter and from the examples included therein.

In accordance with the present invention, the foregoing and other objects and advantages are accomplished in a process wherein the alkali metal compounds, particularly lithium compounds, are separated from the polymer comprising a conjugated diolefin and/or an alkenyl aromatic hydrocarbon monomer by using a suitable adsorbent or mixture of adsorbents to effect the separation. The adsorbents will, of course, be solids and can readily be separated from the polymer composition by physical separation means or the alkali metal compound containing composition can be passed over a fixed bed of such solid adsorbents. Such a separation will, of course, separate all the solid compounds and not introduce any therein thereby leaving the polymer composition free of any impurities introduced as a result of the separation process.

DETAILED DESCRIPTION OF THE INVENTION

As indicated previously, the present invention is drawn to an improved process for separating certain alkali metal compounds, particularly lithium compounds, from a polymer comprising a conjugated diolefin and/or a monoalkenyl aromatic hydrocarbon monomer. The improved process involves the use of a suitable solid adsorbent or mixture of adsorbents to separate the alkali metal compounds from the polymer. As further indicated supra, the solid adsorbents can be separated from the polymer solution using any solid separation technique known in the prior art or a separation step can be completely avoided by passing the alkali metal compound containing polymer solution over a suitable solid adsorbent. The improved process for separating certain alkali metal compounds of this invention offers the advantage of producing a polymer free of any impurities introduced as a result of the alkali metal compound separation step and aside from the step required to separate the solid adsorbent, when this technique is used, does not really introduce any additional steps to the process. The certain alkali metal compounds can be removed from the polymer composition by contacting the polymer solution with a suitable solid adsorbent.

Suitable solid adsorbents include high surface area adsorbents including alumina, silica alumina and silica. Suitable high surface area solid adsorbents will have a particle size within the range of from 0.15 to 12 mm and a pore size within the range from 30 to 10,000 Å. Solid adsorbents within the ranges heretofore noted will work best when dry at the larger particle size and pore sizes within the ranges set forth and will work best wet when smaller particle size and smaller pore sizes within the ranges set forth are used. When the suitable solid adsorbent is used wet from about 10 to 100% of its pore volume will be occupied by water. The higher water contents within this range are most suitable for the smallest pore sizes and smallest particle sizes within the range heretofore recited.

In general, during separation of the certain alkali metal compounds, the polymer may be present in a suitable solvent at a concentration within the range from about 2 to about 30 weight percent, based on total solution, and the certain alkali metal compounds may be present at a concentration within the range from 0.005 to 5 wt % based on polymer. In general, the contacting will be accomplished at a temperature within the range from 5 to 100° C, a pressure within the range from 0 to 600 psig and at a nominal holding time within the range from 10 to 100 minutes. It will, of course, be appreciated that low molecular weight, liquid, polymers could be used in the process of this invention without a solvent (i.e. 100% solids content).

In general, the method of this invention can be used to separate certain alkali metal compounds from any polymer comprising a conjugated diolefin and/or an alkenyl aromatic hydrocarbon monomer unit which is prepared with an alkali metal or an alkali metal compound catalyst or initiator. Such polymers may be random or block and linear, branched, or radial. Such polymers include polymers containing monomer units of one or more conjugated diolefins, polymers containing one or more conjugated diolefins and one or more alkenyl aromatic hydrocarbon monomers and polymers comprising alkenyl aromatic hydrocarbon monomer units which will copolymerize using alkali metal or alkali metal compound catalysts or initiators. In general, the conjugated diolefin will contain from 4 to 12 carbon atoms. Such diolefins include 1,3-butadiene, isoprene, piperylene, methylpentadiene, phenylbutadiene, 3,4-dimethyl-1,3-hexadiene, 4,5-diethyl-1,3-octadiene and the like; and the alkenyl aromatic hydrocarbon monomer will contain from 8 to 14 carbon atoms. Such monomers include styrene, various alkyl substituted styrenes such as alphamethyl styrene, ethyl styrene and the like, alkoxystyrenes such as paramethoxystyrene, ethoxystyrene and the like, vinylnaphthalene, vinyltoluene and the like. The polymer may be hydrogenated or neat during the alkali metal compound separation step although, generally, it is desirable to separate the lithium compounds prior to hydrogenation.

As indicated supra, the polymer will generally be in solution when the alkali compounds are removed but as indicated previously, this is not necessary with liquid polymers. Preferably, the polymer will be in the same solvent as it was prepared but, as a practical matter, essentially any suitable hydrocarbon solvent could be used to place the polymer in solution. Suitable solvents include, but are not necessarily limited to, hydrocarbons such as paraffins, cycloparaffins, alkyl substituted cycloparaffins, aromatics and alkyl substituted aromatics, all containing from 6 to 10 carbon atoms per molecule. Specific suitable solvents include benzene, toluene, cyclohexane, methylcyclohexane, n-butane, n-hexane, n-heptane and the like. Ethers, such as diethyl ether, tetrahydrofuran, etc. can also be used. As is well known, the polymer can be prepared in any one or more of these solvents or the solvent used for preparation can be separated using suitable means and the polymer dissolved, when necessary, in a different solvent.

As indicated previously, the alkali metal compound will be separated by contacting with a suitable solid adsorbent. In general, the solid adsorbent will be used at a concentration within the range from 1 to 50 weight percent based on polymer. It will, of course, be appreciated that higher solid adsorbent concentrations will be most effective and would, generally, lead to the use of shorter contacting times. The alkali metal compounds may be in solution or suspended prior to and at least initially during the separation process.

As indicated previously, the polymer solution may be passed over a bed of suitable solid adsorbent or the solid adsorbent may be combined with suitable mixing with the polymer solution and then separated using physical separation means. Suitable physical separation means include centrifugal means, filtration means or settling means. Useful centrifugal means include centrifuges and cyclones. Suitable filtration means include rotary and fixed bed filtration apparatus and the like. Decantation or sedimentation in parallel plate separators may also be used to separate the suitable solid adsorbent from the polymer solution. Passing of the polymer solution over a fixed bed of the suitable solid adsorbent is preferred since this method reduces the number of steps required to produce a polymer for any end use.

In general, any alkali metal compound commonly found in a polymer solution when an alkali metal compound is used as the catalyst or initiator can be separated from the polymer with the method of this invention as can any alkali metal compound produced as a result of coupling an alkali metal compound polymerized polymer. Alkali metal compounds most commonly separated, however, will be the compounds normally produced when an alkali metal catalyst or initiator is deactivated. These include alkali metal hydrides, alkali metal alkoxides, alkali metal hydroxides or compounds produced as the result of coupling. In this regard, when the polymer is coupled, any coupling agent known in the prior art such as divinylbenzene, silicon halides and the like can be used.

Interestingly, alcohol can, in some cases, be used to enhance the separation of this process. Alcohol will, generally, enhance separation effected with larger particle size larger pore size solid adsorbents. When an alcohol such as methanol is used, alkali metal compounds produced when deactivating an alkali metal catalyst or initiator, such as alkali metal hydride and alkali metal hydroxide, will be converted to the corresponding alkali metal alkoxide. This conversion also apparently occurs when an alkali metal halide is separated and an alcohol is used. This, then, has an added advantage of converting harder to separate alkali metal compounds to the more readily separated alkali metal alkoxides. When an alcohol is used it will, generally, be used at a concentration within the range from 0.1 to 10 moles alcohol per mole of alkali metal compound.

DESCRIPTION OF A PREFERRED EMBODIMENT

In a preferred embodiment of the present invention, alumina will be used to separate a lithium halide and/or a lithium methoxide from a polymer comprising a conjugated diolefin and an alkenyl aromatic hydrocarbon monomer. In a most preferred embodiment, the polymer will be a block copolymer comprising a conjugated diolefin monomer block and an aromatic hydrocarbon monomer block. In a most preferred embodiment, the conjugated diolefin will be either isoprene or butadiene and the aromatic hydrocarbon monomer will be styrene. In the preferred embodiment, the polymer solution will be diluted to a polymer concentration within the range from 5 to 25 weight percent polymer based on total solution.

In the preferred embodiment of this invention, contacting between the alumina and the lithium compound-containing polymer will be accomplished at a temperature within the range from 15° to 60° C., a total pressure within the range from 25 to 200 psig and at a nominal holding time within the range from 20 to 100 minutes. The alumina will be used at a concentration within the range from 5 to 25 weight percent based on polymer.

Having thus broadly described the present invention add a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this example, silica having a particle size of about 1.6 mm and a pore size of 600 Å was used to separate lithium bromide from an SBS block copolymer comprising a butadiene polymer block having a number average molecular weight of 60,000 and styrene polymer blocks, each having a number average molecular weight of 10,000. The polymer and lithium bromide were contained in a solvent comprising 75 weight percent cyclohexane and 25 weight percent isopentane at a concentration of 35 weight percent. During the separation, the polymer concentration was reduced to 17.8 weight percent by adding additional cyclohexane. The polymer solution contained 385 ppm lithium bromide. The contacting between the silica and the lithium bromide containing polymer solution was effected at a temperature of 25° C., at ambient pressure and at a holding time of 72 hours. Three different runs were completed in this example. In the first run, the silica was used dry, in the second run the silica was used with 50 volume percent of its pores filled with water and, in the third run, the silica was used with 100% of its pore volume filled with water. After 72 hours, the polymer was decanted, diluted with tetrahydrofuran and analyzed for bromide content. 27.4% of the bromide was removed with the dry adsorbent, 79.1% of the bromide was removed with the 50% wet adsorbent and 87.9 weight percent of the bromide was removed with the 100% wet silica sample. The separation was accomplished, in each case by introducing three ounces of the polymer cement with the adsorbent into a bottle and then allowing the bottle to roll at a medium speed for 72 hours.

EXAMPLE 2

In this example, alumina having a particle size of about 1.6 mm and a pore size of primarily 30 to 10,000 Å was used to separate lithium bromide from a block copolymer comprising a butadiene block having a number average molecular weight of 60,000 and styrene polymer blocks of number average molecular weight of 10,000. Again, the polymer was contained, initially, in a solvent comprising 75% cyclohexane and 25% isopentene and the polymer was diluted from a concentration of 35 weight percent to 17.8 weight percent based on total solution. The polymer feedstock contained 385 parts per million lithium bromide. The contacting between the alumina and the lithium bromide containing polymer solution was effected at a temperature of 25° C., ambient pressure and at a holding time of 72 hours. Three different runs were again completed in this example. In the first run, the alumina was used dry, in the second run, the alumina was used with 50% of its pore volume filled with water and in the third run the alumina had 100% of its pore volume filled with water. After completion of each run the polymer cements were decanted, diluted with tetrahydrofuran and analyzed for bromide concentration. In the three runs, the amount of bromide actually separated was 24.0 weight percent when the alumina was dry, 57.3 weight percent when the alumina was 50% wet and 76.6 weight percent when the alumina was 100% wet.

EXAMPLE 3

In this example, the three runs of Example 2 were repeated except that an alumina having a particle size of about 4.0 mm and a pore size of primarily 30 to 10,000 Å was substituted for the alumina used in Example 2. After the runs were completed, the polymer was analyzed for bromide content and the amount of bromide removed was 59.9% when the alumina was used dry, 47.7 weight percent when the alumina was used 50% wet and 91.0 weight percent when the alumina was used 100% wet.

EXAMPLE 4

In this example, the runs of Example 2 were repeated except that an alumina having a particle size of about 0.8 mm and a pore size of about 90 Å was substituted from the alumina used in Example 2. After the runs were completed, the polymer was analyzed and the amount of bromide actually removed determined. In this example, the amount of bromide actually removed was 37.0 weight percent when the alumina wa used dry, 72.6% when the alumina was used 50% wet and 87.3 weight percent when the alumina was used 100% wet.

EXAMPLE 5

In this example, the three runs of Example 2 were repeated except that an alumina having a particle size of about 1.3 mm and a pore size of about 90 Å was substituted for the alumina used in Example 2. In this example, the amount of lithium removed was 39.3 weight percent when the alumina was dry, 77.7 weight percent when the alumina was 50% wet and 54.8 weight percent when the alumina was 100% wet.

EXAMPLE 6

In this example, the runs of Example 2 were repeated except that an alumina having a particle size of about 0.2 mm and a pore size of primarily 30 to 10,000 Å was substituted for the alumina used in Example 2. After the runs were completed, it was determined that 71.8 weight percent of the lithium was removed when the alumina was used dry, 96.9 weight percent of the lithium was removed when the alumina was used 50% wet and 95.8 weight percent of the lithium was removed when the alumina was used 100% wet.

EXAMPLE 7

In this example, the runs of Example 6 were repeated except that an alumina having a particle size of about 0.6 mm was used. After the runs were completed, it was determined that 60.2 weight percent of the lithium was removed when the alumina was used dry, 92.4% weight percent of the lithium was removed when the alumina was used 50% wet and 89.8 weight percent of the lithium was removed when the alumina was used 100% wet.

EXAMPLE 8

In this example, the three runs of Example 6 were again repeated except that an alumina having a particle size of about 1.8 mm was used. After the runs were completed it was determined that 53.1 weight percent of the lithium was removed when the alumina was used dry, 60.2 weight percent of the lithium was removed when the alumina was used 50% wet and 88.1 weight percent of the lithium was removed when the alumina was used 100% wet.

EXAMPLE 9

In this example, silica having a particle size of 1.6 mm and a pore size of 600 Å was used to separate lithium bromide from an SBS block copolymer comprising a butadiene polymer block having a number average molecular weight of 60,000 and styrene polymer blocks of number average molecular weight of 10,000. Again, the polymer was contained, initially, in a solvent comprising 75% cyclohexane and 25% isopentane. Initially, the polymer was at 35 weight percent in solution but it was diluted to 19 weight percent, based on total solution, before the lithium was removed. The polymer feedstock solution contained 442 ppm lithium bromide. The contacting between the silica and the lithium bromide containing polymer solution was effected at a temperature of 25° C., ambient pressure and at a holding time of 72 hours. Three different runs were completed in this example. In the first run, the silica was used dry, in the second run the silica was used with 50% of its pore volume filled with water and in the third run the silica had 100% of its pore volume filled with water. The polymer was contacted with the silica by placing three ounces of polymer solution with the requisite amount of silica in a jar and allowing the jar to roll at medium speed. Methanol was added to the polymer solution prior to mixing with the silica at a concentration of 5.5 moles per methanol mole of lithium in the polymer. In the three runs completed in this example, the amount of lithium removed was 82.1 weight percent when the alumina was dry, 97.3 weight percent when the alumina was 50% wet and 96.8% when the silica was 100% wet.

EXAMPLE 10

In this example, the three runs of Example 9 were repeated except that an alumina having a particle size of about 1.6 mm and a pore size of primarily 30 to 10,000 Å was substituted for the silica. The amount of lithium removed in the three runs was 76.4 weight percent when the alumina was dry, 75.7 weight percent when the alumina was 50% wet and 91.2 weight percent when the alumina was 100% wet.

EXAMPLE 11

In this example, the runs of Example 9 were repeated except that an alumina having a particle size of about 4.0 mm and a pore size of primarily 30 to 10,000 Å was substituted for the silica. After the runs were completed, it was determined that 83.1 weight percent of the lithium was separated when the alumina was dry, 46.7 weight percent of the lithium was removed when the alumina was 50% wet and 80.8 weight percent of the lithium was removed when the lithium was 100% wet.

EXAMPLE 12

In this example, the three runs of Example 9 were repeated except that an alumina having a particle size of about 0.8 mm and a pore size of about 90 Å was substituted for the silica. After the runs were completed, it was determined that 75.9 weight percent of the lithium was removed when the alumina was dry, 79.1 weight percent of the lithium was removed when the alumina was 50% wet and 69.5 weight percent of the lithium was removed when the alumina was 100% wet.

EXAMPLE 13

In this example, the three runs of Example 9 were repeated except that an alumina having a particle size of about 1.3 mm and a pore size of about 90 Å was substituted for the silica. After the runs were completed, it was determined that 80.0 weight percent of the lithium was removed when the alumina was dry, 82.8 weight percent of the lithium was removed when the alumina was 50% wet and 66.8 weight percent of the lithium was removed when the alumina was 100% wet.

EXAMPLE 14

In this example, the three runs of Example 9 were repeated except that an alumina having a particle size of about 0.2 mm and a pore size of primarily 30 to 10,000 Å was substituted for the silica. After the runs were completed, it was determined that 87.2 weight percent of the lithium was removed when the alumina was dry, 96.8 weight percent of the lithium was removed when the alumina was 50% wet and 97.3 weight percent of the lithium was removed when the alumina was 100% wet.

EXAMPLE 15

The three runs of Example 14 were repeated with the alumina having a particle size of about 0.6 mm with the following results: 84.5 weight percent of the lithium was removed when the alumina was dry, 93.6 weight percent of the lithium was removed when the alumina was 50% wet and 96.3 weight percent of the lithium was removed when the lithium was 100% wet.

EXAMPLE 16

The three runs of Example 14 were again repeated with an alumina having a particle size of about 1.8 mm with the following results: 90.4 weight percent of the lithium was removed when the alumina was dry, 71.5 weight percent of the lithium was removed when the alumina was 50% wet and 94.4 weight percent of the lithium was removed when the alumina was 100% wet. The results obtained when the alumina was 50% wet in this example are somewhat out of line when compared to the results obtained in Examples 14 and 15 and the reason for this is not known.

As will be apparent from reviewing the data set forth in Examples 1–16 and by comparing the results achieved in Examples 9–16 with the results of Examples 1–8 the most effective adsorbent will contain either 50 or 100% water when no alcohol is used and the use of an alcohol, particularly methanol, enhances the separation, particularly when the adsorbent is otherwise dry. 50% water content in the adsorbent seems to be most effective at moderate particle size and pore size while 100% water appears to be most effective at small particle and small pore sizes.

Having thus described and illustrated the invention what is claimed is:

1. A process for separating certain alkali metal compounds from a solution of a polymer comprising a conjugated diolefin and/or an alkenyl aromatic hydrocarbon monomer, said polymer containing one or more alkali metal compounds, comprising the steps of:
   (a) contacting the polymer solution with a suitable solid adsorbent selected from the group consisting of alumina, silica alumina, silica and mixtures thereof, wherein 10 to 100% of the pour volume of the solid adsorbent is occupied by water;
   (b) separating the solid adsorbent from the polymer solution; and
   (c) recovering the polymer containing a reduced amount of alkali metal compounds.

2. The process of claim 1 wherein the time of contacting in step (a) is within the range from 10 to 180 minutes.

3. The process of claim 1 wherein said solid adsorbent is alumina.

4. The process of claim 1 wherein said solid adsorbent is silica.

5. The process of claim 1 wherein the solid adsorbent is separated using physical separation techniques.

6. The process of claim 1 wherein said conjugated diolefin is selected from the group consisting of butadiene and isoprene and said alkenyl aromatic hydrocarbon monomer is styrene.

7. The process of claim 6 wherein said polymer is a block copolymer.

8. The process of claim 1 wherein the polymer is contained in a suitable liquid hydrocarbon and the concentration of said polymer is within the range from 1 to 30 weight percent based on total solution.

9. The process of claim 1 wherein the concentration of the solid adsorbent is within the range from 1 to 50 weight percent based on polymer.

10. The process of claim 9 wherein the solid adsorbent concentration is from 5 to 25 weight percent.

11. The process of claim 1 wherein said alkali metal compound containing polymer is passed over a fixed bed of the solid adsorbent.

12. The process of claim 1 wherein the alkali metal is lithium.

13. The process of claim 1 wherein the polymer is contained in a suitable hydrocarbon.

14. The process of claim 1 wherein an alcohol is added to the polymer solution in step (a) to enhance the separation of the alkali metal compounds.

15. The process of claim 14 wherein the alcohol is used at a concentration of 0.1 to 10 moles alcohol per mole of alkali metal compound.

16. The process of claim 14 wherein methanol is used in combination with the solid adsorbent to effect separation of the alkali metal compound.

17. The process of claim 1 wherein at least 50 volume percent of the pores of the solid adsorbent are filled with water.

* * * * *